(12) United States Patent
Kouzu et al.

(10) Patent No.: US 7,543,794 B2
(45) Date of Patent: Jun. 9, 2009

(54) TORQUE-TRANSMITTING DEVICE FOR USE IN AIR CONTROL VALVE

(75) Inventors: Takahiro Kouzu, Kariya (JP); Satoshi Ishigaki, Takahama (JP); Tadashi Komiyama, Chiryu (JP)

(73) Assignee: Denso Corporation, Kariya (JP)

( * ) Notice: Subject to any disclaimer, the term of this patent is extended or adjusted under 35 U.S.C. 154(b) by 282 days.

(21) Appl. No.: 11/593,035

(22) Filed: Nov. 6, 2006

(65) Prior Publication Data

US 2007/0102660 A1 May 10, 2007

(30) Foreign Application Priority Data

Nov. 4, 2005 (JP) ............... 2005-320739

(51) Int. Cl.
*F16K 31/53* (2006.01)
(52) U.S. Cl. ............... 251/129.11; 251/250.5; 251/337
(58) Field of Classification Search ............ 251/129.11, 251/129.12, 129.13, 250, 250.5, 337
See application file for complete search history.

(56) References Cited

U.S. PATENT DOCUMENTS

| | | | | |
|---|---|---|---|---|
| 4,203,573 A | * | 5/1980 | Boss ................ | 251/129.11 |
| 4,805,573 A | * | 2/1989 | Macfarlane et al. ......... | 123/403 |
| 4,951,915 A | * | 8/1990 | Piao ............... | 251/14 |
| 4,961,355 A | * | 10/1990 | Irino et al. ......... | 74/513 |
| 5,653,419 A | * | 8/1997 | Uchisawa et al. ......... | 251/58 |
| 5,775,292 A | * | 7/1998 | Seeger ............... | 123/396 |
| 6,032,924 A | * | 3/2000 | Castle ............... | 251/129.12 |
| 6,173,939 B1 | * | 1/2001 | Dottavio et al. ....... | 251/129.12 |
| 6,267,352 B1 | * | 7/2001 | Semeyn et al. ........ | 251/129.12 |
| 6,471,184 B1 | * | 10/2002 | McIntosh ............ | 251/321 |
| 6,912,994 B2 | | 7/2005 | Ozeki et al. | |
| 2004/0007685 A1 | * | 1/2004 | Chang ............... | 251/250 |

FOREIGN PATENT DOCUMENTS

JP 2004-144039 5/2004

* cited by examiner

*Primary Examiner*—John Bastianelli
(74) *Attorney, Agent, or Firm*—Nixon & Vanderhye, PC

(57) ABSTRACT

A torque-transmitting device is advantageously applied to a secondary air control valve mounted on an automotive vehicle. The device includes a gear train for reducing a rotational speed of a motor and a mechanism for converting a rotational motion to a linear motion of a valve shaft. The gear train includes a final gear coupled to the valve shaft, and the final gear includes a flange positioned at an axial end of an axis of the final gear. A coil spring for biasing the final gear toward a predetermined position is disposed next to the flange and around the axis of the final gear. Slits or holes are formed through the flange, so that holding jigs for holding the coil spring are inserted, in an assembling process, into a cylindrical space between an inner circumference of the coil spring and the axis of the final gear.

8 Claims, 4 Drawing Sheets

TORQUE-TRANSMITTING DEVICE FOR USE IN AIR CONTROL VALVE

CROSS-REFERENCE TO RELATED APPLICATION

This application is based upon and claims benefit of priority of Japanese Patent Application No. 2005-320739 filed on Nov. 4, 2005, the content of which is incorporated herein by reference.

BACKGROUND OF THE INVENTION

1. Field of the Invention

The present invention relates to a torque-transmitting device for transmitting a torque from a rotating power source to a valve for controlling an amount of air, and more particularly to a torque-transmitting device including a gear train for reducing rotational speed and a spring biasing the valve to an initial position.

2. Description of Related Art

A device for controlling an opening degree of a throttle valve installed in an internal combustion engine mounted in an automotive vehicle has been known hitherto. An example of this kind of device is disclosed in JP-A-2004-144039. A relevant portion of this disclosure is shown in FIGS. 6 and 7 attached thereto. The valve-controlling device includes a torque-transmitting device that transmits a driving torque of an electric motor 101 connected to a motor shaft 102 to a throttle valve shaft 104 connected to a throttle valve 103. The torque-transmitting device is constituted by a gear train for reducing a rotational speed of the motor 101. The gear train is composed of a motor-side gear 111 connected to the motor shaft 102, an intermediate gear 112 engaging with the motor-side gear 111 and a valve-side gear 113 engaging with the intermediate gear 112. The valve-side gear 113 is connected to an end of the valve shaft 104 by staking via a metal plate 114.

A coil spring 105 for biasing the throttle valve 103 to an initial position (e.g., a fully open position or an intermediate position between a fully closed position and a fully open position) is disposed around the throttle valve shaft 104. The coil spring 105 is disposed in a cylindrical space 117 formed between an inner spring guide 115 of the valve-side gear 113 and an outer spring guide 116 of a housing 106. One end of the coil spring is coupled to spring hook of the housing 106, and the other end of the coil spring 105 is coupled to another sprig hook of the valve-side gear 113. The valve-side gear 113 has to be positioned in the housing 106 at a predetermined angle relative to the housing 106.

The valve-controlling device disclosed in JP-A-2004-144039, however, involves following problems. The valve-side gear 113 is installed in the housing 106 after the coil spring 105 is disposed around the inner spring guide 115. In this process, one end of the coil spring 105 is coupled to the spring hook formed in the housing 106 while holding an outer periphery of the valve-side gear 113 with a holding jig. Relatively large spaces "A" and "B" (shown in FIG. 7) for inserting the holding jig have to be provided between the outer periphery of the valve-side gear 113 and the outer spring guide 116 of the housing 106. Therefore, it is unavoidable that the housing 106 becomes large in size. Further, since a disc plate portion 121 and a large-diameter portion 122 cover an axial end of the coil spring 105, as shown in FIG. 6, the coil spring 105 has to be disposed around the inner spring guide 115 of the valve-side gear 113 before the valve-side gear 113 is assembled to the housing 106. This makes the assembling process complex. In addition, a depressed portion 123 (shown in FIG. 6) for accommodating the axial end of the coil spring 105 has to be formed in the valve-side gear 113. This makes the shape of the valve-side gear 113 complex.

SUMMARY OF THE INVENTION

The present invention has been made in view of the above-mentioned problems, and an object of the present invention is to provide an improved torque-transmitting device which is compact in size and easy to assemble in a casing, thereby reducing a manufacturing cost.

The torque-transmitting device transmits a torque of a power source to a device to be driven. The torque-transmitting device of the present invention is advantageously applied to a secondary air control system mounted on an automotive vehicle. The torque-transmitting device includes a gear train for reducing a rotational speed of an electric motor and a mechanism for converting a rotational motion to a linear motion. The gear train includes a final gear coupled to a valve shaft that drives a valve for opening and closing a valve port for supplying secondary air to a catalyst installed in an exhaust pipe.

An axis of the final gear is supported in a casing, and a cylindrical core portion is supported on the axis. At an axial end of the cylindrical core portion, a large-diameter portion having a flange is connected, and a coil spring for biasing the final gear toward a predetermined initial position is disposed next to the flange. The coil spring is wound around the cylindrical core portion, forming a cylindrical space between an inner circumference of the coil spring and the cylindrical core portion. Through-spaces such as slits or holes are formed in the flange so that holding jigs are inserted into the cylindrical space inside the coil spring in a process of assembling the gear train and the coil spring in the casing.

In the assembling process, holding jigs are inserted into the cylindrical space inside the coil spring through the through-spaces, and then the claws installed in the holding jigs are spread in the cylindrical space. The inner circumference of the coil spring and the through-spaces of the flange are held by the spread claws at the same time. A pinion of the final gear to be coupled to a rack formed on the valve shaft is correctly positioned by rotating the holding jigs inserted into the final gear.

Since the through-spaces for inserting the holding jigs into the cylindrical space therethrough are provided in the flange, no extra space for the holding jigs is necessary in the casing. Therefore, the casing containing torque-transmitting device therein can be made small in size. Since the inner circumference of the coil spring and the flange of the final gear are held at the same time by the holding jigs, the process of assembling the gear train in the casing can be simplified.

Other objects and features of the present invention will become more readily apparent from a better understanding of the preferred embodiment described below with reference to the following drawings.

DETAILED DESCRIPTION OF THE PREFERRED EMBODIMENT

A preferred embodiment of the present invention will be described with reference to FIGS. 1-4. A torque-transmitting device according to the present invention is advantageously applied to a secondary air control valve used in an automotive vehicle. The secondary air control valve is used for switching secondary air supplied to a three-way catalyst installed in an exhaust pipe for activating the three-way catalyst. The secondary air is supplied from an electrically driven air pump installed in an engine compartment to the three-way catalyst through the secondary air control valve.

Figure 2:
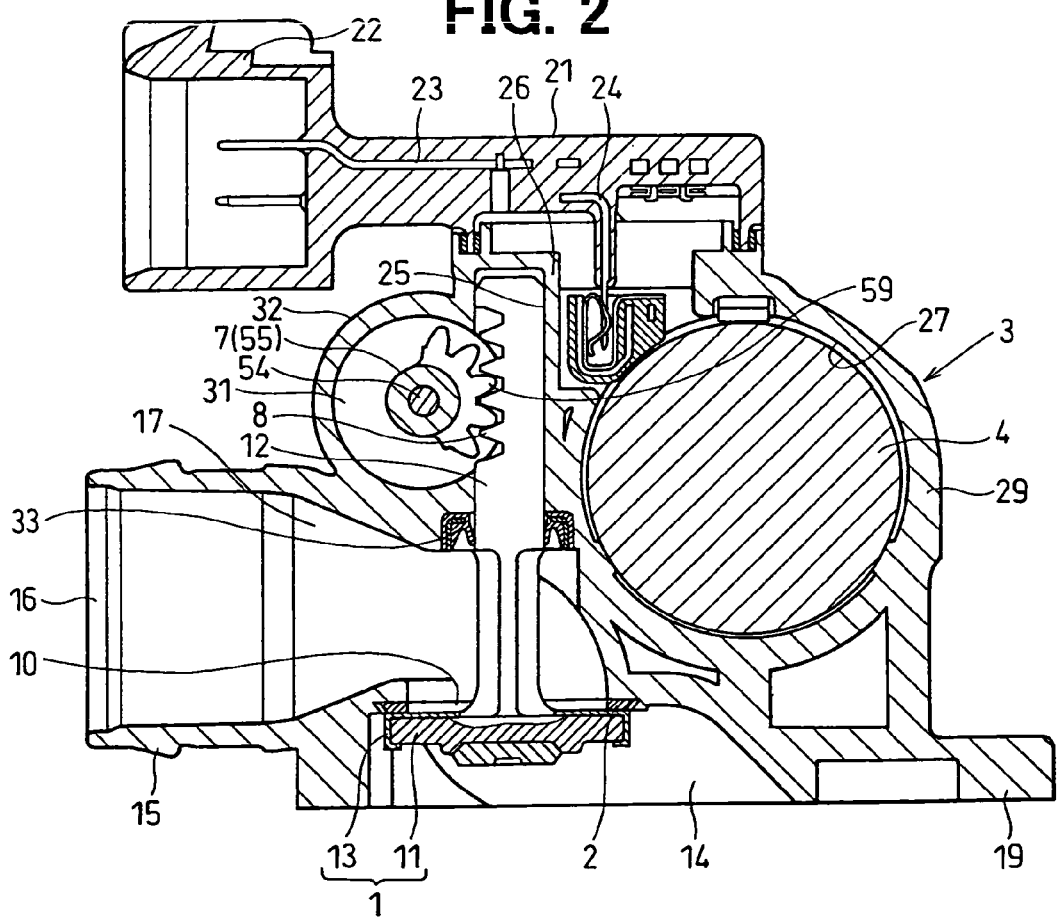
FIG. 2 is a cross-sectional view showing an entire structure of a secondary air control valve in which the torque-transmitting device of the present invention is used.

The secondary air control valve is composed of an air-switching valve (ASV) and a one-way valve for preventing an exhaust gas flow from the exhaust pipe to the air-switching valve. The one-way valve is opened by a pressure of the secondary air supplied through the secondary air control valve and is closed by a pressure of the exhaust gas. The air-switching valve is composed of a poppet valve 1 and a valve seat 2 on which the poppet valve 1 sits (FIG. 2). The air-switching valve is installed in a housing 3. An electric motor 4 for driving the air pump and the air-switching valve is controlled by an electronic control unit (referred to as ECU) according to operating conditions of the engine.

The ECU is constituted by a known microcomputer that includes a central processor unit (CPU) and memories such as ROM and RAM. Upon turning on an ignition switch, the ECU controls operation of the motor 4 based on a program stored in the memory. The motor 4 is driven to open the air-switching valve to supply the secondary air to the three-way catalyst when temperature of exhaust gas is lower than a predetermined level. The exhaust gas temperature is measured by a sensor not shown in the drawing. The secondary air is supplied through the air-switching valve when it is opened.

The poppet valve 1 is made of a resin material and includes a disc-shaped valve head 11 and a sealing rubber 13 covering a periphery and a back surface of the valve head 11. The valve head 11 is connected to a valve shaft 12 that is slidably disposed in the housing so that a valve port 10 is selectively open or closed by the valve head 11. The valve head 11 and the valve shaft 12 may be integrally molded with resin, or they may be separately made and then connected to each other. The sealing rubber 13 connected to the valve head 11 by baking or the like seals between the valve head 11 and a valve seat 2 when the valve head 11 sits on the valve seat 2. A lower portion (a portion close to the valve head 11) of the valve shaft 12 is made hollow, and a rack 8 composed of plural teeth is formed on an upper portion of the valve shaft 12. When the valve port 10 is open, the valve head 11 is positioned in a passage 14 that leads the secondary air to the exhaust pipe.

An air inlet pipe 15 forming an air-introducing passage 17 is integrally formed with the housing 3. The valve seat 2 forming a round valve port 10 may be made separately from the housing 3 and connected to the housing 3. The passage 14 positioned downstream of the valve port 10 is connected to a housing having a one-way valve (not shown). The one-way valve is open by pressure of the secondary air supplied through the valve port 10, and is closed by pressure of the exhaust gas. In this manner, the exhaust gas is prevented from entering into the secondary air control valve. A connecting portion 19 of the housing 3 is connected to the other housing that has the one-way valve. The housing 3 made of a resin material such as polyphenylene sulfide (PPS) contains therein the motor 4, a torque-transmitting device (explained later in detail), and the poppet valve 1 having the valve shaft 12. The poppet valve 1 is biased to the closing position by a coil spring 9 included in the torque-transmitting device.

FIG. 2 shows the housing 3 containing the above-mentioned components therein, with a front cover removed. A molded resin member 21 is connected to an upper portion of the housing 3. The molded resin member 21 is made of a resin material such as polybutylene terephtalate containing 30% glass-fiber (PBTG30). The molded resin member 21 includes a connector shell 22 to be coupled to a wire harness connected to the ECU. Motor terminals 23, 24 are connected to a motor driving circuit in the ECU through the wire harness.

The housing 3 includes a valve shaft guide 26 having a hole 25, a motor case 29 forming a motor space 27, and a gear box 32 forming a gear chamber 31. These portions are integrally made of a resin material, forming a unitary housing 3. The valve shaft 12 is slidably supported in the valve shaft guide 26. A circular sealing rubber 33 is disposed at a bottom end of the valve shaft guide 26 to prevent the secondary air from entering into the hole 25. The motor 4 is disposed in the motor space 27 in the motor case 29. The gear box 32 constitutes a casing together with the front cover. In the casing, a gear train composed of a pinion gear 5, an intermediate gear 6 and a final gear 7 including a coil spring 9 is contained.

The motor 4 is a brushless DC motor composed of a rotor having a permanent magnet and a cylindrical stator having an armature coil. The motor shaft 41 is fixedly connected to the rotor. A pair of terminals 42 (FIG. 3) electrically connects the armature coil to the motor terminal 24. A front end of the motor 4 (a small-diameter portion where a bearing holder is located) is connected to a hole 44 of a metal plate 43 which is in turn connected to the motor case 29 with a screw 45. The brushless DC motor may be replaced with other motors such as a DC motor with brushes or a three-phase induction motor.

Now, the torque-transmitting device for transmitting a rotational torque of the motor 4 to the valve shaft 12 connected to the poppet valve 1 will be described in detail. The torque-transmitting device includes a gear train for reducing a rotational speed of the motor 4. The gear train is composed of a pinion gear 5 connected to the motor shaft 41, an intermediate gear 6 engaging with the pinion gear 5 and a final gear 7 engaging with the intermediate gear 6. The final gear 7 engages with the rack 8 of the valve shaft 12, and thereby the rotational torque transmitted from the motor 4 through the gear train is converted into a linear motion of the valve shaft 12.

Figure 3:
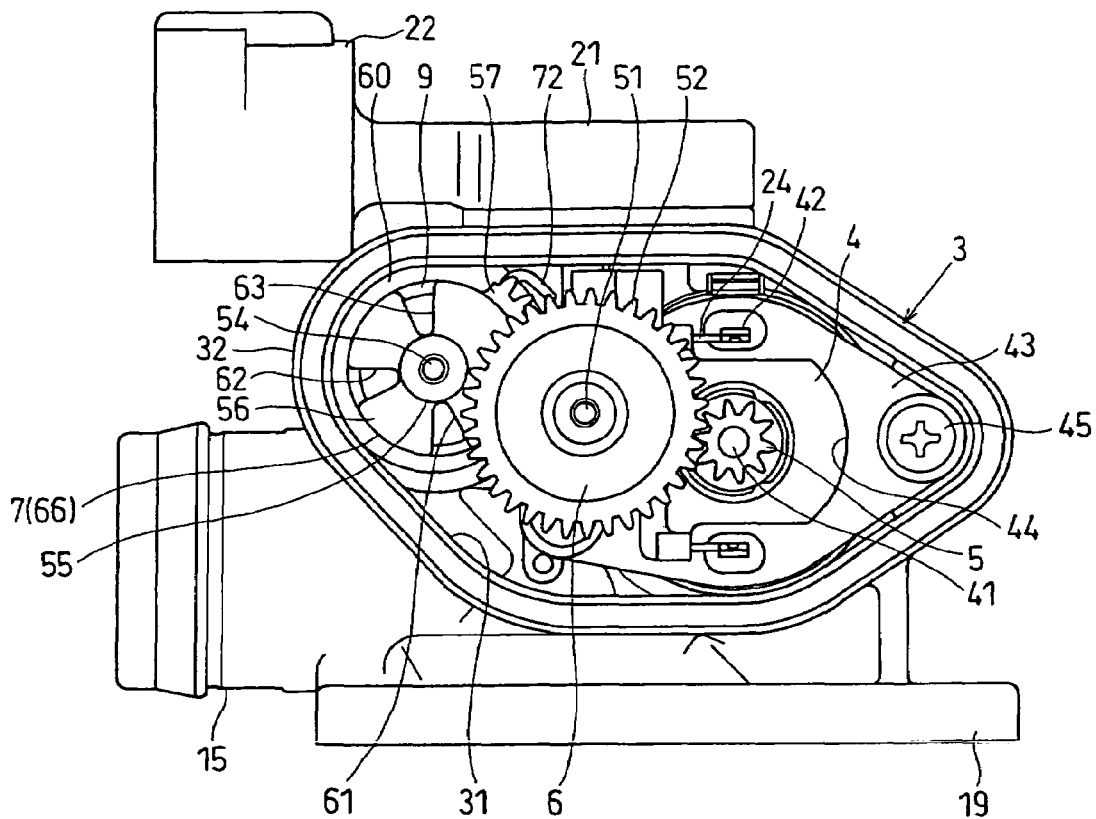
FIG. 3 is a plan view showing the torque-transmitting device assembled in a housing, with an end cover of the housing removed.

As shown in FIG. 3, rotational axes of the pinion gear 5, the intermediate gear 6 and the final gear 7 are all parallel to one another. The pinion gear 5 connected to the motor shaft 41 is rotated by the motor 4. The intermediate gear 6 is rotatably supported on an intermediate gear axis, both ends of which are fixedly connected to the casing. The intermediate gear 6 has a large gear 52 engaging with the pinion gear 5 and a small gear (not shown) engaging with a gear 57 of the final gear 7. The final gear 7 is rotatably supported on a final gear axis 54 that is fixedly supported in the casing. The final gear has a gear 57 engaging with the small gear of the intermediate gear 6 and a pinion 59 engaging with the rack 8.

Figure 1:
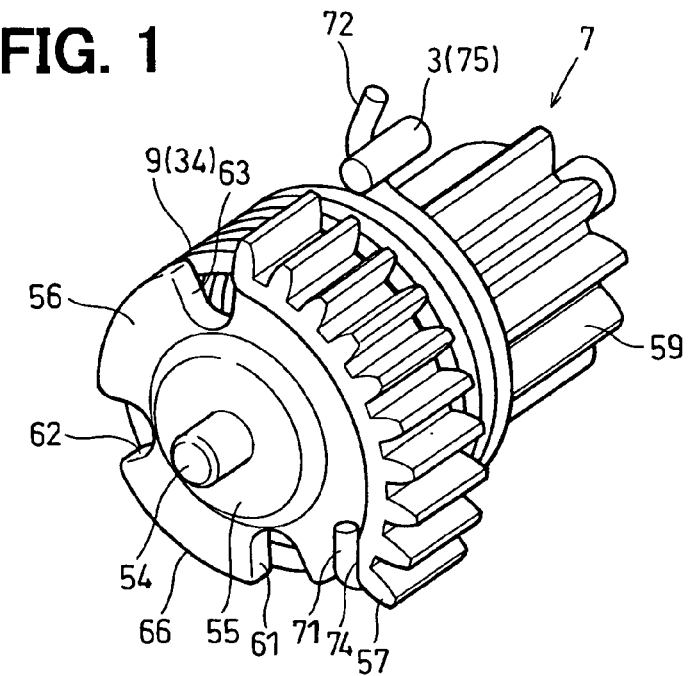
FIG. 1 is a perspective view showing a final gear used in a torque-transmitting device of the present invention.

With reference to FIG. 1 (referring to other drawings, too), the final gear 7 constituting a rotating body of the present invention will be described in detail. The final gear 7 is composed of a cylindrical core portion 55 rotatably supported on the final gear shaft 54, a large-diameter flange 56 formed at one axial end of the cylindrical core portion 55, and a pinion 59 formed at the other axial end of the cylindrical core portion 55. The cylindrical core portion 55, the flange 56 and the pinion 59 are all integrally made of a resin material such as polyamide resin (PA). Between the flange 56 and the pinion 59, a space 60 (FIG. 3) for accommodating a coil spring 9 is formed, and a cylindrical portion 34 of the coil spring 9 is disposed in the accommodating space. An outer periphery 66 of the flange 56 has a diameter larger than an outer diameter of the cylindrical portion 34, and the gear 57 is formed on a portion of the flange to have a lager outer diameter than the outer periphery 66. Accordingly, movement of the coil spring 9 in the axial direction is prevented by the flange 56.

As shown in FIG. 1, three slits 61, 62 and 63 are formed through the flange 56. Each slit forms a through-space in the axial direction from an axial outside of the flange 56 to a cylindrical inner space between the cylindrical core portion 55 and an inner circumference of the coil spring 9. The slit 61, 62, 63 is formed in a U-shape so that the closed end of the slit reaches a position corresponding to the outer surface of the cylindrical core portion 55 (refer to FIG. 4).

In a process for assembling the final gear 7 and the coil spring 9 in the gear box 32 of the housing 3, a holding jig is inserted into each slit 61, 62, 63 from the axial outside of the flange 56 to the inner space of the coil spring 9. The holding jig has three claws that are able to be spread in the radial direction of the holding jig. When the holding jig is positioned in the cylindrical inner space of the coil spring 9, the three claws are spread in the radial direction, so that the inner circumference of the coil spring 9 is held by the claws. At the same time, the sides of the U-shaped slit 61, 62, 63 are also held by the holding jig. The number of claws is not limited to three, but it may be four or more. In this manner, the inner circumference of the coil spring 9 and the U-shaped slit 61, 62, 63 are held or supported by the holding jig at the same time.

As shown in FIG. 2, the pinion 59 of the final gear 7 engages with the rack 8 formed on the valve shaft 12. A rotational motion of the pinion 59 is converted into a linear motion of the valve shaft 12. Plural teeth forming the rack 8 may be formed integrally on the valve shaft 12. Alternatively, the plural teeth may be formed on a separate member, and then the member having the plural teeth formed thereon may be connected to the valve shaft 12.

Figure 4:
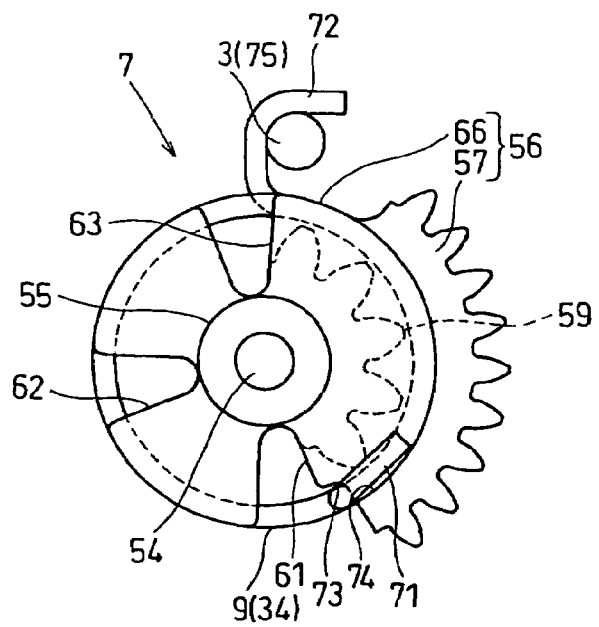
FIG. 4 is a plan view showing a final gear used in the torque-transmitting device.

The coil spring 9 disposed around the cylindrical core portion 55 in the accommodating space 60 (refer to FIG. 3) functions as a torsion spring for giving a biasing force to the valve shaft 12 in the direction closing the poppet valve 1. The coil spring 9 has a first coil end 71 and a second coil end 72. The first coil end 71 is lead out in the axial direction from the cylindrical portion 34 of the coil spring 9 and is bent in an L-shape. The L-shaped first coil end 71 passes through a depression 73 (FIG. 4) formed inside the gear 57 and is coupled to a first hook 74 (FIG. 1). The second coil end 72 is formed at the other end of the coil spring 9 and angled as shown in FIG. 4. The second coil end 72 is coupled to a second hook 75 formed inside the gear box 32.

The final gear 7 and the coil spring 9 are assembled in the gear box 32 of the housing 3 in the following manner. The cylindrical portion 34 of the coil spring 9 is disposed around the cylindrical core portion 55 of the final gear 7. Since the outer diameter of the pinion 59 is smaller than the inner diameter of the cylindrical portion 34, the cylindrical portion 34 of the coil spring 9 easily passes over the pinion 59. Then, the first coil end 71 is coupled to the first hook 74 (FIGS. 1 and 4). One axial end of the coil spring 9 abuts the inner axial end of the flange 56. Then, the final gear axis 54 is fixedly supported in depressions formed in the gear box 32.

Then, three holding jigs are inserted through the slits 61, 62, 63 into the cylindrical inner space of the coil spring 9. Then, the claws of the holding jigs are spread in the radial direction to thereby hold the inner circumference of the coil spring 9 and the sides of the silts at the same time. Then, the pinion 59 is positioned to engage with the rack 8 of the valve shaft 12. To engage the pinion 59 with rack 8 of the valve shaft 12 at the position to close the poppet valve 1, the three holding jigs inserted into the cylindrical inner space of the coil spring 9 and holding the final gear 7 are rotated around the final gear axis 54. Thus, the pinion 59 engages with the rack 8 at the correct position. Then, the second coil end 72 of the coil spring 9 is coupled to the second hook 75 formed on the housing 3. Thus, the final gear 7 and the coil spring 9 is correctly assembled in the gear box 32 of the housing 3.

Now, operation of the secondary air control valve will be explained. A three-way catalyst for converting harmful components such as CO, HC and NOx contained in exhaust gas of an internal combustion engine into harmless components is installed in an exhaust pipe. An air-fuel ratio of a mixture gas supplied to the internal combustion engine is maintained substantially at a stoichiometric ratio (15:1) to obtain an effective operation of the three-way catalyst. The three-way catalyst, however, is not sufficiently active if temperature of the exhaust gas is low (i.e., lower than 350° C.). To activate the three-way catalyst, secondary air is supplied through the secondary air control valve to the catalyst when the exhaust gas temperature is low (e.g., when the engine has been just started). The catalyst is activated by heat generated by burning unburned components using the secondary air supplied.

When the temperature of the catalyst detected by a temperature sensor is lower than a predetermined level, or when the exhaust gas temperature is lower than a predetermined level, the air pump is driven by the electric motor to supply the secondary air to the catalyst. On the other hand, the poppet valve 1 is driven by the electric motor 4 to open the valve port 10. That is, the rotational torque of the motor 4 is transmitted through the torque-transmitting device to the valve shaft 12. More particularly, a rotational speed of the motor 4 is reduced through the gear train composed of the pinion gear 5, the intermediate gear 6 and the final gear 7. The rotation of the pinion 59 of the final gear 7 is converted into the linear motion of the valve shaft 12, thereby opening the valve port 10. Since the coil spring 9 disposed around the cylindrical core portion 55 of the final gear 7 biases the valve shaft 12 to the closing direction, the valve shaft 12 is driven to the opening position against the biasing force of the coil spring when the motor 4 is driven.

The secondary air sent from the air pump flows through the air-introducing passage 17 and the open valve port 10 into the passage 14. The one-way valve disposed in a port connected to the passage 14 is open by a pressure of the secondary air. The secondary air is supplied to the three-way catalyst to activate the same. In this manner, the three-way catalyst is made active even when the exhaust gas temperature is low, and the harmful components in the exhaust gas are converted into harmless components.

Advantages attained in the present invention will be summarized. The coil spring 9 is disposed around the cylindrical core portion 55 of the final gear 7, and the flange 56 of the final gear 7 defines the axial position of the coil spring 9. Three slots 61, 62, 63 (through-spaces) are formed through the flange 56, so that the jigs for holding the inner circumference of the cylindrical portion 34 of the coil spring 9 and the flange 56 at the same time can be inserted therethrough. In the process of assembling the final gear 7 and the coil spring 9 in the gear box 32 of the housing 3, the holding jigs do not interfere with an inner wall of the gear box 32. Therefore, a clearance between the inner wall of the gear box 32 and the outer circumference of the cylindrical portion 34 of the coil spring 9 can be made small. This means that the space 60 for accommodating the coil spring 9 can be made small. Accordingly, the housing 3 having the gear box 32 can be made small in size.

The final gear 7 and the coil spring 9 are held at the same time in the assembling process by spreading the claws provided in the holding jigs. It is not necessary to form a structure for holding the coil spring 9 in the final gear 7. Therefore, the final gear 7 can be made in a simplified shape, and the process of assembling the final gear 7 and the coil spring 9 in the housing 3 is simplified. Accordingly, a manufacturing cost of the torque-transmitting device can be lowered.

Figure 5:
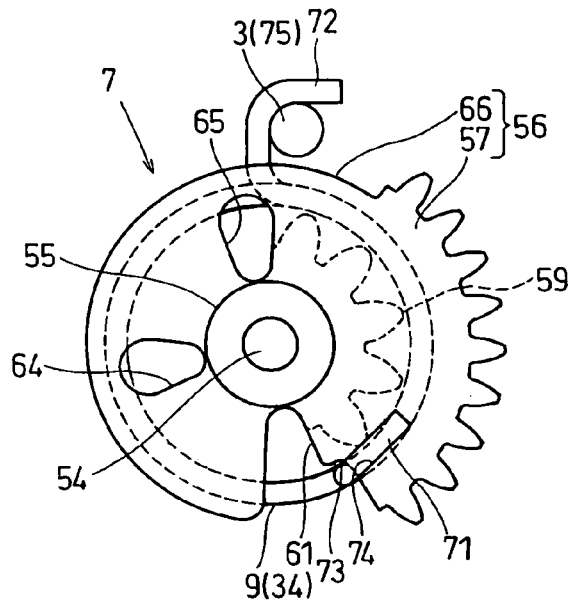
FIG. 5 is a plan view showing a modified form of the final gear shown in FIG. 4.
Figure 6:
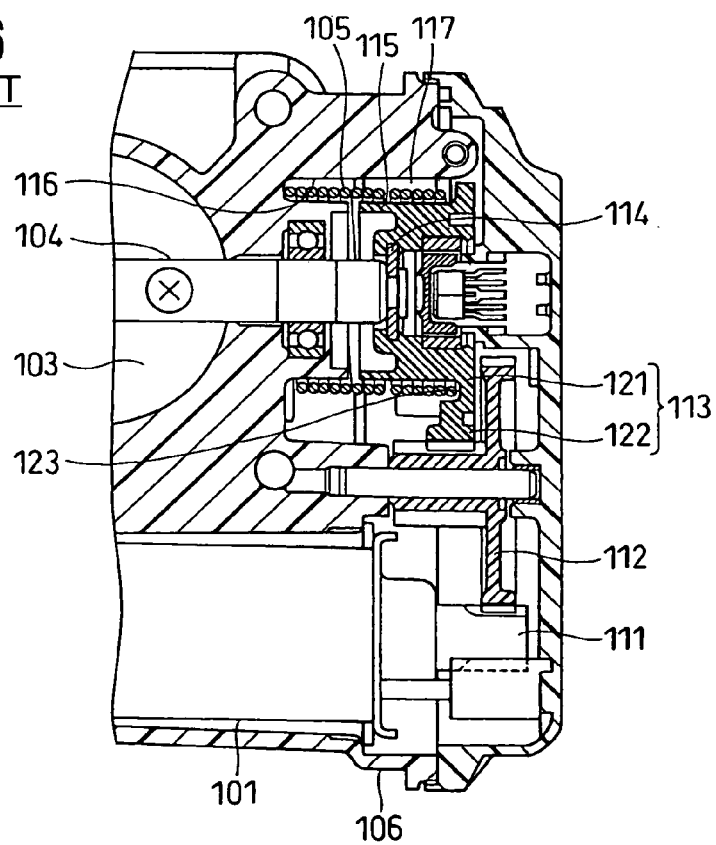
FIG. 6 is a cross-sectional view partially showing a conventional valve-controlling device.
Figure 7:
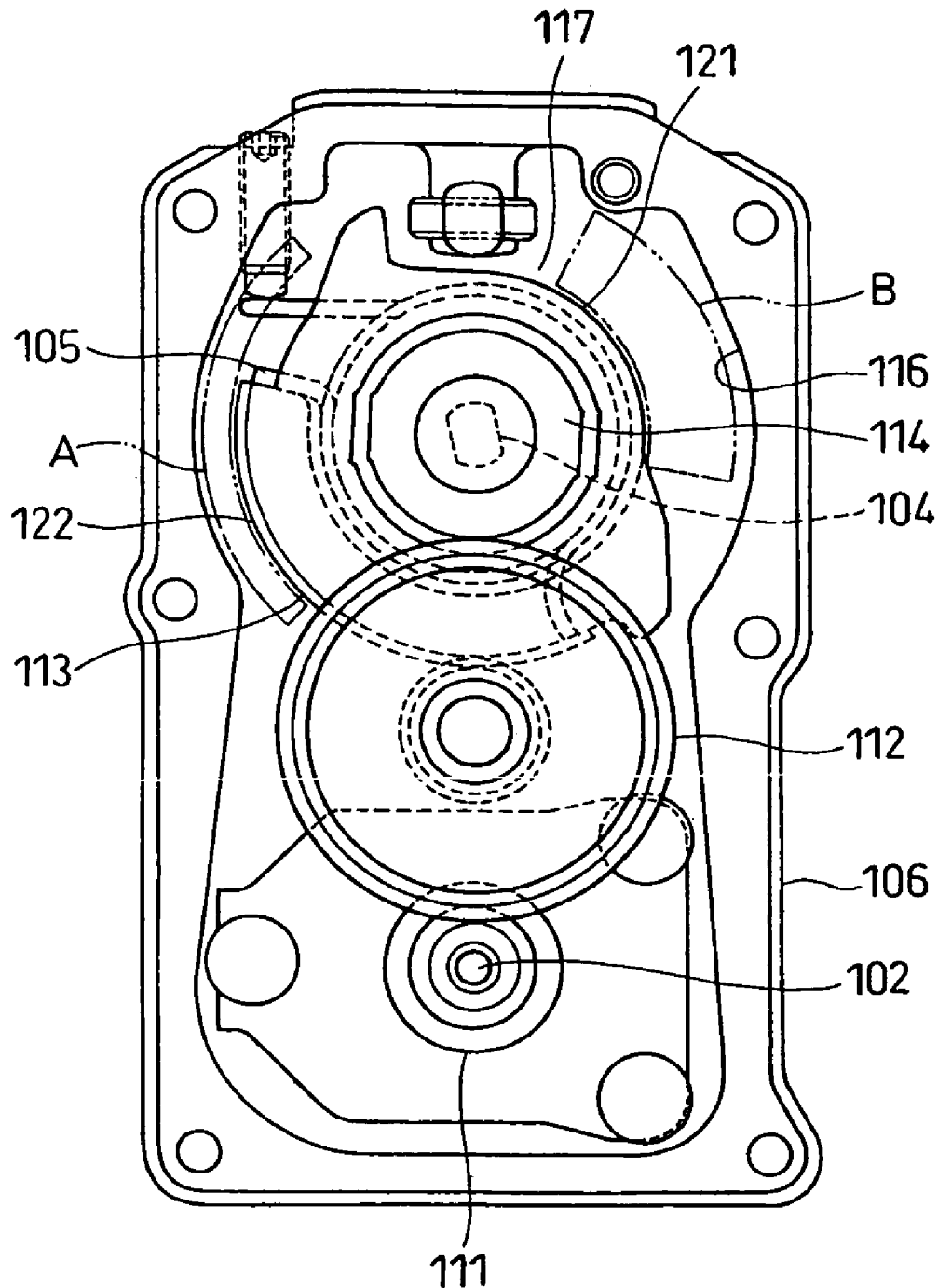
FIG. 7 is a plan view showing the conventional valve-controlling device shown in FIG. 6, with an end cover of a housing removed.

In the case where the outer diameter of the cylindrical portion 34 of the coil spring 9 is much smaller than the diameter of the outer periphery 66 of the flange 56, as shown in FIG. 5, the slits 62 and 63 shown in FIG. 1 may be modified to holes 64 and 65 shown in FIG. 5. Each hole 64, 65 is formed in an oval shape, so that the outer end of the oval corresponds to a center portion of the cylindrical portion 34 of the coil spring 9, and the inner end of the oval reaches a vicinity of the outer circumference of the cylindrical portion 55, as shown in FIG. 5. In this modified form, the slit 61 is the same as that shown in FIG. 1.

The present invention is not limited to the embodiment described above, but it may be variously modified. The present invention may be applied to various devices other than the secondary air control valve, such as an intake air control device having a swirl valve, a tumble valve, a throttle valve or an idle speed control valve. Further, the torque-transmitting device of the present invention may be applied to an exhaust gas recirculation system. The one-way valve may not be necessary in these devices.

Further, the torque-transmitting device of the present invention may be used as a device for driving a valve for switching a fluid passage, a valve for interrupting a fluid passage, a valve for controlling an amount of fluid, or a valve for controlling fluid pressure. As these valves, a rotary valve, a butterfly valve, a shutter valve or a ball valve may be used. A valve shaft and a valve may be made separately and then both maybe connected. As the fluids to be controlled, various fluids, such as air, steam, gas such as refrigerant in gaseous state, water, fuel, oil, liquid such as refrigerant in liquid state, or mixture fluid of gas and liquid, may be used. Further, the torque-transmitting device of the present invention may be applied to a door for switching a fluid passage in an air-conditioner or a door lock.

In place of the motor that is used as a driving power source in the embodiment of the present invention, a manual power source, such as a throttle lever in a motorcycle, may be used. Though a gear is used as the rotating body in the foregoing embodiment, a lever member such as a link-lever may be used as the rotating body. In place of the coil spring used in the foregoing embodiment, a double coil spring, an unevenly pitched coil spring, a straw-bag coil spring may be used.

Though the housing 3 including the valve shaft guide 26, motor case 29 and the gear box 32 is integrally formed in the foregoing embodiment by resin molding, one or more these portions may be separately formed. The gear chamber 31 for containing the gear train and a valve body movably containing the poppet valve 1 may be separately formed. Though the final gear axis 54 is fixedly supported in the housing 3 in the foregoing embodiment, it may be rotatably supported, and the cylindrical core portion 55 may be fixedly connected to the final gear axis 54.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A torque-transmitting device for transmitting a torque from a driving source to a valve for opening and closing a valve port, the torque-transmitting device comprising:
   a casing;
   a gear train supported in the casing and disposed between the driving source and a valve shaft connected to the valve, the gear train including a rotating body having an axis supported in the casing, the rotating body being coupled to the valve shaft for driving the valve shaft; and
   a coil spring disposed around the axis to supply a biasing force to the rotating body in a predetermined direction,
   wherein:
   the rotating body includes a cylindrical core portion rotatably supported on the axis and a large-diameter portion having a diameter larger than a diameter of the cylindrical core portion, the large-diameter portion being connected to the cylindrical core portion;
   a space for accommodating the coil spring is formed between the casing and the cylindrical core portion, and a cylindrical space is formed between an inner circumference of the coil spring and the cylindrical core portion; and
   the large-diameter portion includes a through-space connecting an axial outside of the large-diameter portion and the cylindrical space,
   wherein the through-space comprises a plurality of U-shaped slits formed in the large-diameter portion, each U-shaped slit having a radially outer open end, open at a radially outer periphery of the large-diameter portion, and a radially inner closed end, positioned at an outer periphery of the cylindrical core portion.

2. The torque-transmitting device as in claim 1, wherein:
   the axis is fixed to the casing, and the cylindrical core portion is rotatably supported on the axis.

3. The torque-transmitting device as in claim 1, wherein:
   the axis is rotatably supported in the casing, and the cylindrical core portion is fixed to the axis.

4. The torque-transmitting device as in claim 1, wherein:
   the rotating body constitutes a final gear in the gear train, and the valve shaft includes a rack engaging with the final gear to thereby converting a rotational motion of the final gear to a linear motion of the valve shaft.

5. The torque-transmitting device as in claim 1, wherein:
   the large-diameter portion has a diameter larger than a diameter of the inner circumference of the coil spring, and is disposed at an axial end of the cylindrical core portion thereby to separate the accommodating space from an outside of the rotating body.

6. The torque-transmitting device as in claim 1, wherein:
   the coil spring is disposed around the cylindrical core portion and in the accommodating space for biasing the rotating body in a direction toward a predetermined initial position of the rotating body.

7. The torque-transmitting device as in claim 1, wherein:
the coil spring includes a first end held on the rotating body and a second end supported in the casing.

8. The torque-transmitting device as in claim 1, wherein:
the through-space functions as a passage, through which a holding jig is inserted into the cylindrical space between the inner circumference of the coil spring and the cylindrical core portion from an outside of the large-diameter portion in a process of assembling the gear train in the casing; and the holding jig includes a plurality of holding claws for holding the inner circumference of the coil spring and the through-space of the large-diameter portion at the same time.

* * * * *